United States Patent
Alcone et al.

[11] Patent Number: 6,032,770
[45] Date of Patent: Mar. 7, 2000

[54] LOW FORCE ACTUATOR FOR SUSPENSION CONTROL

[75] Inventors: Jerry M. Alcone; Kirk A. Lohnes; James W. Jeter, all of Albuquerque, N.Mex.

[73] Assignee: Raytheon Company, Lexington, Mass.

[21] Appl. No.: 08/046,056

[22] Filed: Apr. 12, 1993

[51] Int. Cl.$^7$ ........................................................ F16F 7/10
[52] U.S. Cl. .................... 188/378; 280/5.512; 280/5.515
[58] Field of Search ........................... 188/298, 299, 188/322.5, 267; 280/707, 840; 267/64.16; 364/424.05

[56] References Cited

U.S. PATENT DOCUMENTS

| | | | |
|---|---|---|---|
| 3,807,678 | 4/1974 | Karnopp et al. ....................... | 188/299 |
| 4,749,210 | 6/1988 | Sugasawa ................................ | 280/707 |
| 4,776,610 | 10/1988 | Moog ..................................... | 280/707 |
| 4,809,179 | 2/1989 | Klinger et al. ......................... | 280/840 |
| 4,887,699 | 12/1989 | Iueus ..................................... | 280/707 |
| 4,981,309 | 1/1991 | Froeschle et al. ..................... | 280/707 |
| 5,174,598 | 12/1992 | Sato et al. .............................. | 280/707 |
| 5,217,246 | 6/1993 | Williams et al. ....................... | 280/840 |

*Primary Examiner*—Chris Schwartz
*Attorney, Agent, or Firm*—Colin M. Raufer; Leonard A. Alkov; Glenn H. Lenzen, Jr.

[57] ABSTRACT

A low force actuator that is used in conjunction with semi-active and passive suspension systems to provide for improved suspension and ride control for vehicles, and which overcomes stiction and provides limited active capability. The low force actuator is sized to counter the small, high frequency forces (caused by road input disturbances and stiction effects) that act on, or are transmitted between sprung and unsprung masses of the vehicle. The present invention provides for two low force actuators. The first comprises a proof mass low force electromagnetic actuator that may be connected to either the sprung or unsprung mass. In either configuration the proof mass provides an extra degree of freedom for the suspension system that decouples ride and holding control actions of the vehicle. The second comprises a differential force actuator that uses an electromagnetic actuator to provide a force between the sprung and unsprung masses of the vehicle. This implementation is inherently simpler and lighter than the proof mass implementation but can only improve ride at the expense of holding, and vice versa, since its reaction force is directly coupled to the vehicle system. The present low force actuator eliminates hoses, accumulators, pumps, and leaks associated with hydraulic systems employed in active suspension control systems.

1 Claim, 6 Drawing Sheets

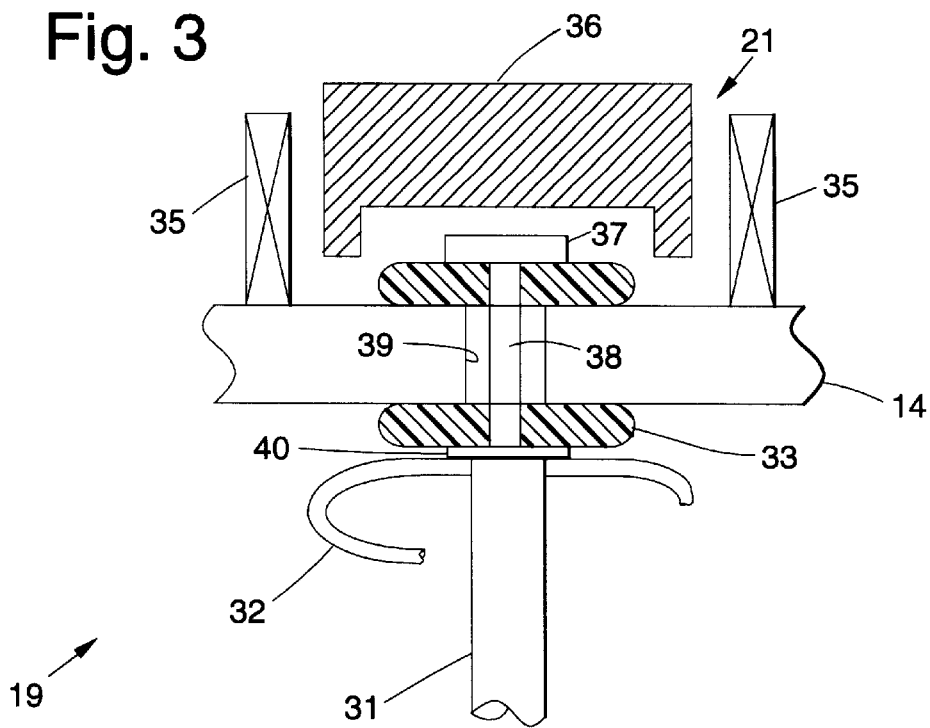
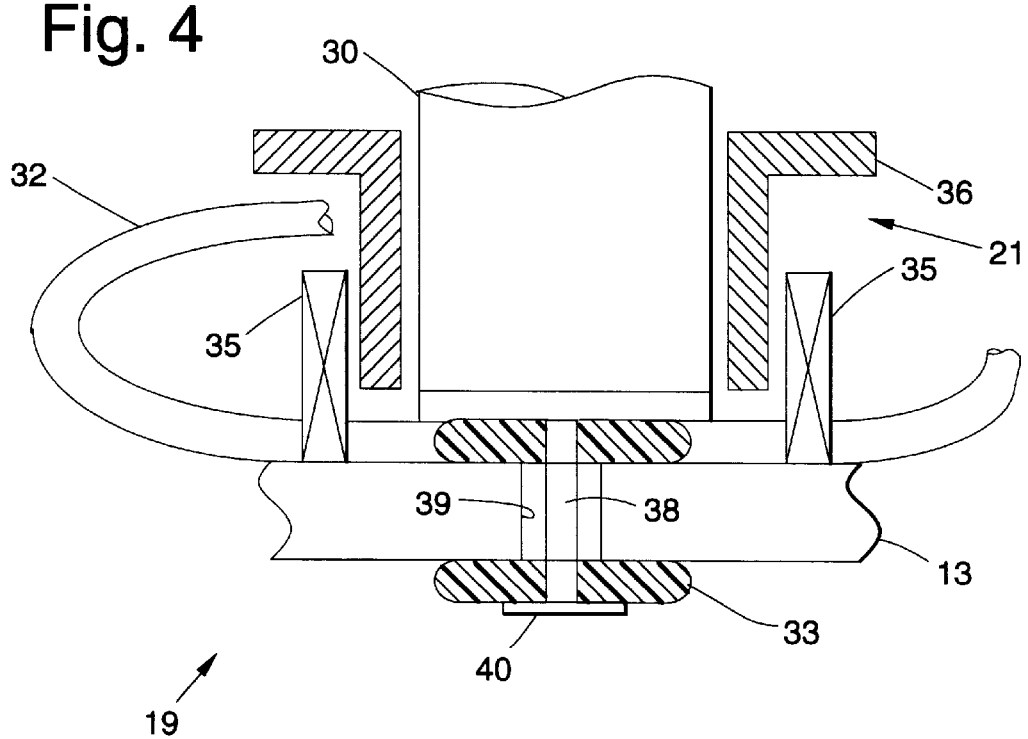

LOW FORCE ACTUATOR FOR SUSPENSION CONTROL

BACKGROUND

The present invention relates generally to vehicle suspension control systems, and more particularly, to low force actuators for use in such vehicle suspension control systems.

In general conventional vehicle suspension control systems are either passive, active, or semi-active. Semi-active and passive systems are, by definition, incapable of providing active forces, and in the presence of stiction, are inherently "locked up" for small disturbances. Passive practice is to experimentally tailor the suspension parameters to each vehicle model. The passive system is tuned to the perceived requirements of the potential customers. Sports cars are stiffly sprung and highly damped. Luxury cars are softly sprung and lightly damped. Passive implementations have fixed parameters and represent highly compromised designs. Semi-active practice appears to be evolving to the use of closed loop controllers to adjust the damping characteristics of the suspension. These systems provide significant improvement in ride and holding performance except for "smooth roads". The "smooth road" performance is limited by suspension stiction and valve transients in the damping adjustment mechanism that can occur (dependent on mechanism design) when the shock relative velocity changes sign.

Active suspension systems as currently implemented are high pressure, high flow hydraulic systems. Practice has been to build systems capable of lifting a corner of the vehicle off the ground. These systems are high force, high bandwidth systems and hence high power (25 horse power is typical for a large vehicle). Active systems universally exhibit harshness and degraded ride performance on "smooth roads". They are implemented using high pressure and flow hydraulic actuators. These systems are expensive and power inefficient. They take up a lot of volume, since they require accumulators, tubing, pumps, valve, and hoses, and the like.

For active systems, prior practice has been to use high force actuators (3000–5000 N) capable of literally lifting a corner of the vehicle off the ground. At the dynamic ranges typical of low cost control systems (100:1) these systems simply do not have the resolution required to control the small disturbance inputs (less than 200 N) that occur most of the time when driving over "smooth" roads.

The harshness is caused by the high power, high force levels that are controlled by control systems that use inexpensive sensors (low dynamic range, nonlinear). This practice results in degraded ride on "smooth roads" because of the dynamic range limitations of the systems (if you must control 1000's of Newtons it's hard to control to 10's of Newtons with inexpensive controls). High pressure high flow hydraulic systems are never going to be inexpensive and will always require a lot of power.

SUMMARY OF THE INVENTION

The present invention overcomes the limitations of conventional semi-active and passive systems by providing a low force actuator that is used in conjunction with these conventional systems to provide for improved suspension and ride control for vehicles. The present invention adds a low force actuator to a passive or semi-active suspension system to overcome stiction and to provide a limited active capability. The low force actuator is sized to counter the small, high frequency forces (caused by road input disturbances and stiction effects) that act on, or are transmitted between the sprung and unsprung masses of the vehicle. These disturbances are annoying and difficult to eliminate using prior active, semi-active and passive suspension practices. By introducing a high bandwidth low force actuator, a suspension control system may be configured to eliminate small high frequency disturbances while mitigating larger disturbances.

More particularly, the present invention provides for two low force actuators. The first implementation, a proof mass low force actuator, comprises a proof mass and a linear electromagnetic actuator. The proof mass low force actuator may be connected to either the sprung or unsprung mass of the vehicle. In either configuration the proof mass provides an extra degree of freedom for the suspension system. This extra degree of freedom provides for a control system that decouples ride and holding control actions for a vehicle.

The second implementation, a differential force low force actuator, uses a linear electromagnetic actuator to provide a force between the sprung and unsprung masses of the vehicle. This implementation is inherently simpler and lighter than the proof mass implementation, but can only improve ride at the expense of holding, and vice versa, since its reaction force is directly coupled to the vehicle system.

Conventional semi-active and passive systems are unlocked using the low force actuator in accordance with the present invention. For relatively smooth roads, the active force requirement for a typical vehicle is on the order of 200 N most of the time. The low force actuators of the present invention work in conjunction with the semi-active or passive system, letting them meet the high power requirements when they can, while it concentrates on improving the low power behavior of the system.

Low force actuators are attractive for automotive applications because most of the time, suspension forces are small (less than 200 N). For many bumps, the suspension remains locked up by stiction effects (typically suspension stiction is on the order of 100–200N). The present low force actuator is implemented electromagnetically, thus eliminating hoses, accumulators, pumps, and leaks associated with hydraulic systems employed in active suspension control systems.

The low force actuators of the present invention are needed to implement hybrid suspension systems for vehicles or for the isolation of sensitive payloads. Hybrid suspension systems make use of low force active and high force semi-active actuator subsystems to achieve improved ride (or isolation) and holding with low cost, power, weight, and volume requirements.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 3 illustrates the proof mass low force actuator mounted to a vehicle body;

FIG. 4 illustrates the proof mass low force actuator mounted to a vehicle suspension;

DETAILED DESCRIPTION

Figure 1:
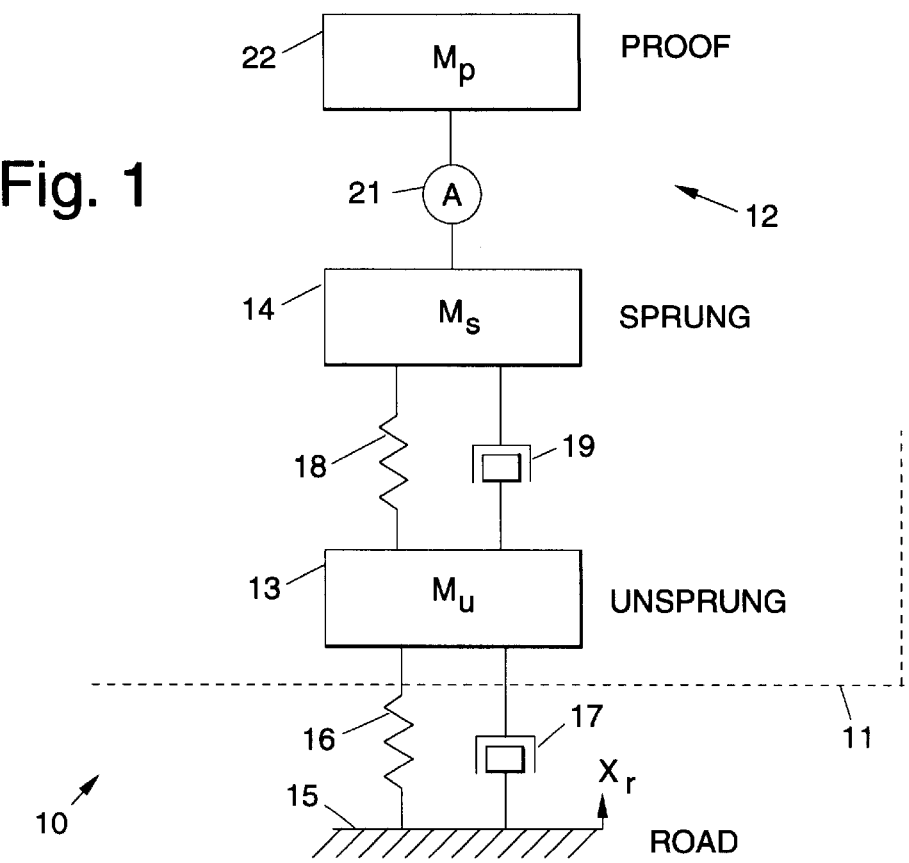
FIG. 1 illustrates a proof mass actuator system in accordance with the principles of the present invention.

Referring to the drawing figures, the present invention provides for two implementations of low force actuators for use in vehicle suspension systems.

FIG. 1 illustrates a first suspension system 10 of a vehicle 11 using a proof mass (seismic) low force actuator 12 in accordance with the principles of the present invention. FIG. 1 is representative of a single corner of the vehicle 11, basically at the location of one wheel thereof. The vehicle 11 comprises an unsprung mass 13 and a sprung mass 14. The unsprung mass 13 of the vehicle is comprised of the tire and wheel of the vehicle 11 along with components (suspension and brake components) that are attached thereto. The unsprung mass 13 is directly coupled to the road 15 by means of the tires. A spring 16 and shock absorber or damper 17 are representative of the tire of the vehicle 11. A second spring 18 and shock absorber 19 disposed between the unsprung and sprung masses 13, 14 are representative of the first suspension system 10 of the vehicle 11. The proof mass low force actuator 12 is comprised of a linear actuator (A) 21, which is typically an electromagnetic actuator, and a proof mass 22 coupled thereto. The proof mass 22 can be a separate mass, but is typically one or more magnets of the actuator 21 as will be described in more detail below.

The proof mass low force actuator 12 may be coupled to either the sprung or unsprung masses 14, 13. In either configuration the proof mass 22 provides an extra degree of freedom to the first suspension system 10. This means that ride and holding characteristics of the vehicle 11 can be individually controlled at a given corner (tire) of the vehicle 11. In either configuration the proof mass 22 provides an extra degree of freedom for the first suspension system 10. This extra degree of freedom allows the design of a suspension control system that decouples ride and holding control actions of the vehicle 11.

Figure 2:
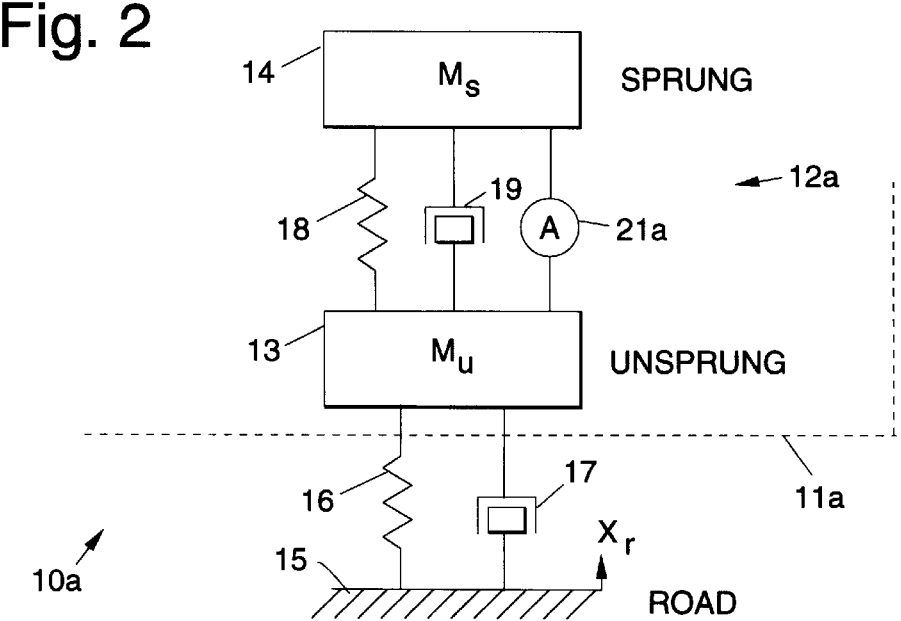
FIG. 2 illustrates a basic differential force actuator system in accordance with the principles of the present invention.

FIG. 2 illustrates a second suspension system 10a of a vehicle 11a using a differential force low force actuator 12a in accordance with the principles of the present invention. The differential force low force actuator 12a uses a linear electromagnetic actuator 21a to provide a force between sprung and unsprung masses 14, 13. This implementation is simpler than the first suspension system 10 but ride and holding performance of the vehicle 11a are inversely coupled. The second suspension system 10a can only improve ride at the expense of holding, and vice versa, since its reaction force is directly coupled to the vehicle 11a.

For this case, ride control is obtained by commanding the linear actuator 21a to minimize acceleration of the sprung mass 14 (and hence act as a regulator). Holding control of the vehicle 11a is obtained by commanding the linear actuator 21a to minimize that component of acceleration of the unsprung mass 13 that is correlated to the acceleration of the sprung mass 14.

The low force actuators 12, 12a shown in FIGS. 1 and 2 may be added to a conventional passive or semi-active suspension system to overcome stiction and to provide limited active capability for the vehicle 11, 11a. The low force actuators 12, 12a are sized to counter the small, high frequency forces (caused by road input disturbances and stiction effects) that act on, or are transmitted between the sprung and unsprung masses 13, 14. These disturbances are annoying and difficult to eliminate using conventional active, semi-active and passive suspension practices.

By providing a high bandwidth low force actuator as part of the suspension control system, it may be configured to eliminate small high frequency disturbances while mitigating larger disturbances. For active systems, prior practice has been to use high force actuators (3000–5000 N) capable of literally lifting a corner of the vehicle 11, 11a off the ground. At the dynamic ranges typical of low cost control systems (100:1) these systems simply do not have the resolution required to control the small disturbance inputs (less than 200 N) that occur most of the time when driving over relatively smooth roads.

FIGS. 3 and 4 show proof mass low force actuators 12 integrated into the vehicle 11. FIG. 3 illustrates a body-mounted proof mass low force actuator 12 where the low force actuator 12 is mounted above a shock absorber 19 on the sprung mass 14. More particularly, FIG. 3 shows a shaft 31 of the shock absorber 19 which has an upper flange 40 that abuts a rubber bushing 33. An upper portion 38 of the shaft 31 extends through a hole 39 in the sprung mass 14 and is secured thereto by a locking nut 37. A coil spring 32, which forms part of the shock absorber 19 is shown for clarity. The linear actuator 21 includes coils 35 and a magnet 36. The magnet 36 is disposed above the sprung mass 14 and is secured to a portion of the vehicle 11. Coils 35 are secured to the sprung mass 14 and are adapted to move with it relative to the magnet 36.

FIG. 4 illustrates a suspension-mounted proof mass low force actuator 12 where the low force actuator 12 is mounted within the shock absorber 19 on the unsprung mass 13. It is to be understood that this concept may be used to mount the low force actuator 12 on the sprung mass 14. More specifically, FIG. 4 shows a shock housing 30 surrounding the shaft 31 of the shock absorber 19 which has its upper flange 40 abutting the rubber bushing 33. The upper portion 38 of the shaft 31 extends through a hole 39 in the sprung mass 13. The coil spring 32, which forms part of the shock absorber 19 is shown for clarity. A magnet 36 is disposed above the unsprung mass 13 outside the shock housing 30 and is secured to a portion of the vehicle 11. Coils 35 are secured to the unsprung mass 13 and are adapted to move with it relative to the magnet 36.

Figure 5:
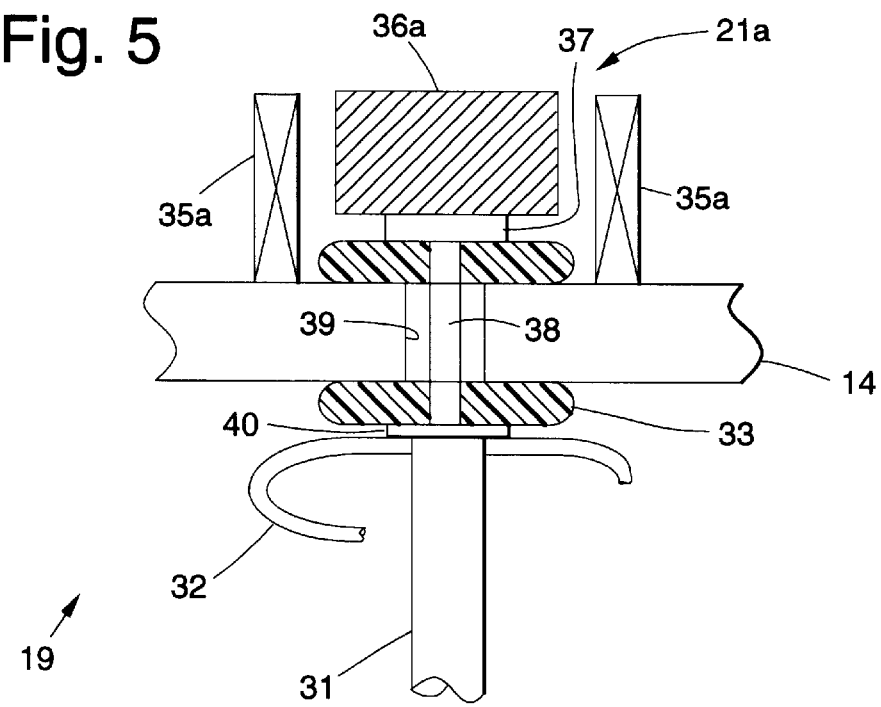
FIG. 5 illustrates a differential force low force actuator mounted on a sprung mass of a vehicle.
Figure 6:
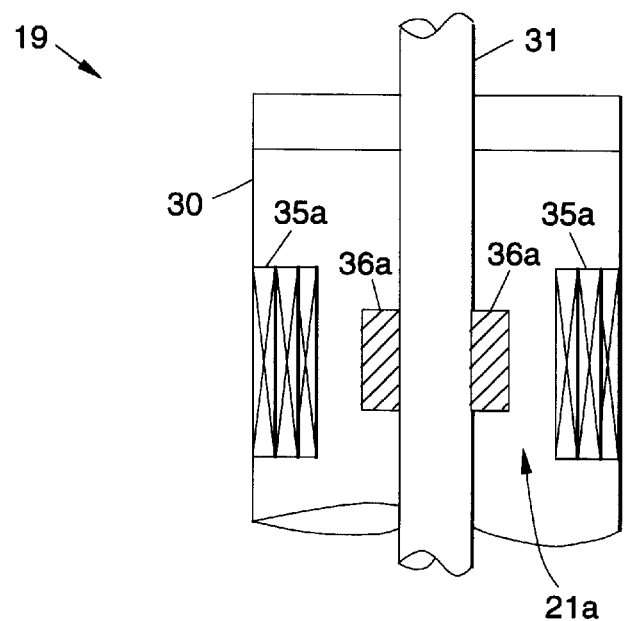
FIG. 6 illustrates a differential force low force actuator mounted within a suspension system of a vehicle.

FIGS. 5 and 6 illustrate two approaches to the integration of the differential force low force actuator 12a in the vehicle 11a. FIG. 5 illustrates the differential force low force actuator 12a mounted on the sprung mass 14 of the vehicle 11a, above the suspension system 10a. More particularly, FIG. 5 shows a shaft 31 of the shock absorber 19 which has its upper flange 40 abutting the rubber bushing 33. The upper portion 38 of the shaft 31 extends through the hole 39 in the sprung mass 14 and is secured thereto by the locking nut 37. The coil spring 32, which forms part of the shock absorber 19 is shown for clarity. The magnet 36a of the linear actuator 21a is disposed above the sprung mass 14 and is secured to the locking nut 37. Coils 35a of the linear actuator 21a are secured to the sprung mass 14 and are adapted to move with it relative to the magnet 36.

FIG. 6 illustrates the differential force low force actuator 12a mounted within the suspension system 10a of a vehicle 11a. In particular, the differential force low force actuator 12a is mounted within the shock absorber 19. FIG. 6 shows the inside of the shock absorber 19 illustrating the magnet 36a secured to the shaft 31 and the coils 35a secured to an interior wall of the shock housing 30. In this configuration, the low force actuator 12a is only effective near a nominal (static equilibrium) position of the suspension system 10 since the magnet 36a may move to a point outside the actuator coils 35a. This is a reasonable design compromise since the low force actuator 12 by its nature (low force) has little capability to effect performance at large suspension loads which imply large deflections.

The proof mass actuator 12 described above may be controlled to improve ride and/or holding of the vehicle 11. Since reaction forces are absorbed by the proof mass 22, vehicle ride can be improved with minimal impact on holding, and vice versa. To improve ride, the acceleration of the sprung mass 14 is sensed and the linear actuator 21 is commanded to provide a force that opposes the forces exerted on the sprung mass 14 by way of the components of the passive (or semi-active) suspension system 10.

To improve holding of the vehicle 11, the low force actuator 12 is commanded so as to minimize variations in the tire-road contact force from its static (equilibrium) value. This is done by sensing accelerations of both the sprung and unsprung masses 14, 13 and commanding the actuator 21 to oppose the accelerations (forces) imposed by the sprung mass 14 on the unsprung mass 13. Thus the unsprung mass 13 (wheel) is free to follow the road 15 to the best of its ability.

Figure 7:
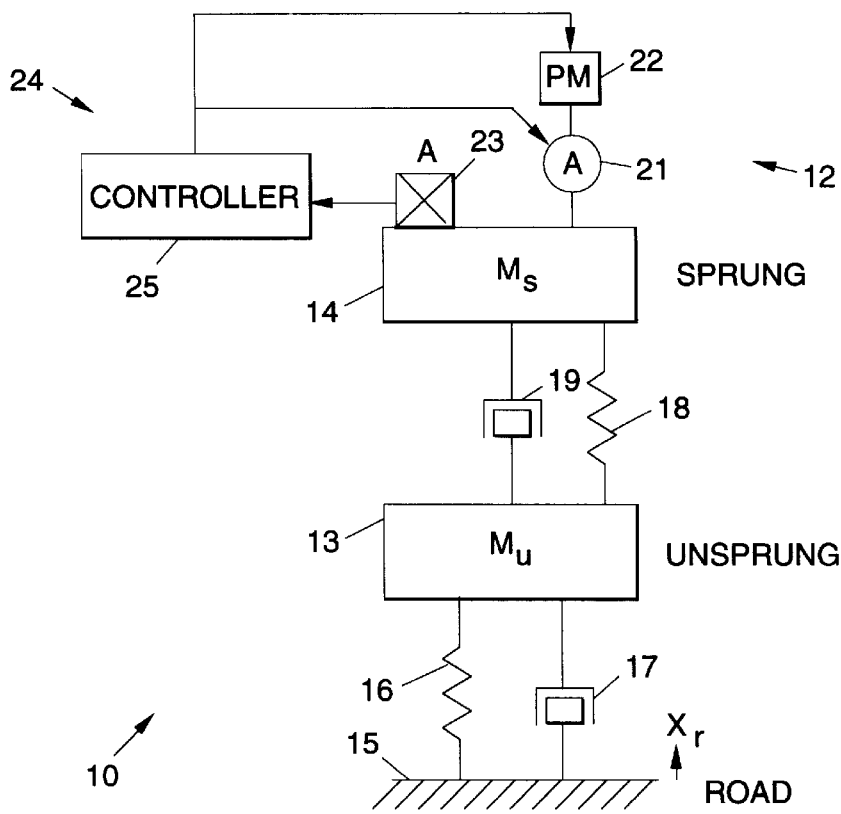
FIG. 7 illustrates a ride control system using the proof mass low force actuator of FIG. 1.
Figure 8:
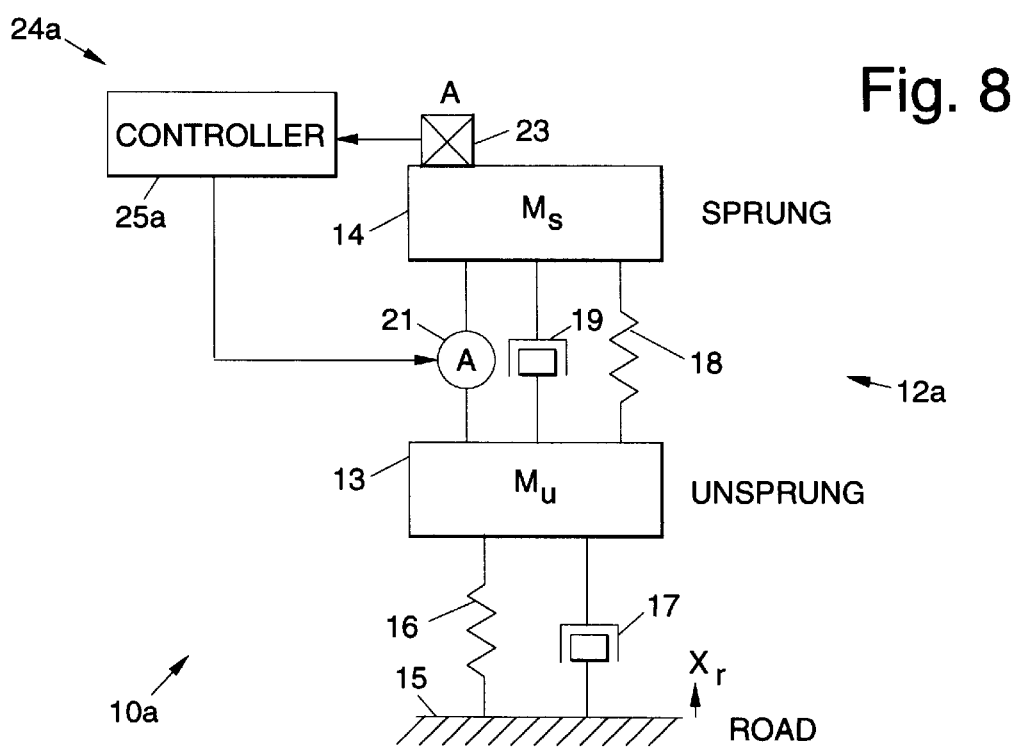
FIG. 8 illustrates a ride control system using the differential force low force actuator of FIG. 2.

Two basic control system approaches have been developed for use with the low force actuators 12, 12a of the present invention. One approach uses conventional control concepts to close ride and/or holding control loop(s) on the suspension system 10, 10a using the proof mass or differential force actuators 12, 12a as is shown in FIGS. 7 and 8. More specifically, FIG. 7 illustrates the first ride control system 24 for the proof mass low force actuator 12, while FIG. 8 illustrates the second ride control system 24a for the differential force actuator 12a. Note, that while a passive suspension system is shown in the drawing figures, the concepts of the present invention are equally applicable to a hybrid suspension system design.

The first control system 24 for the proof mass low force actuator 12 includes a controller 25 that is coupled to a sensor or accelerometer 23 disposed on the sprung mass 14. The controller 25 is also coupled to the proof mass low force actuator 12 which is controlled to oppose the forces exerted on the sprung mass 14 by way of the components of the passive (or semi-active) suspension system 10. The second control system 24a (FIG. 8) for the differential actuator 12a includes a controller 25a that is coupled to the sensor or accelerometer 23 disposed on the sprung mass 14. The controller 25a is also coupled to the differential force actuator 12a which is controlled to oppose the accelerations (forces) imposed by the sprung mass 14 on the unsprung mass 13.

Figure 9:
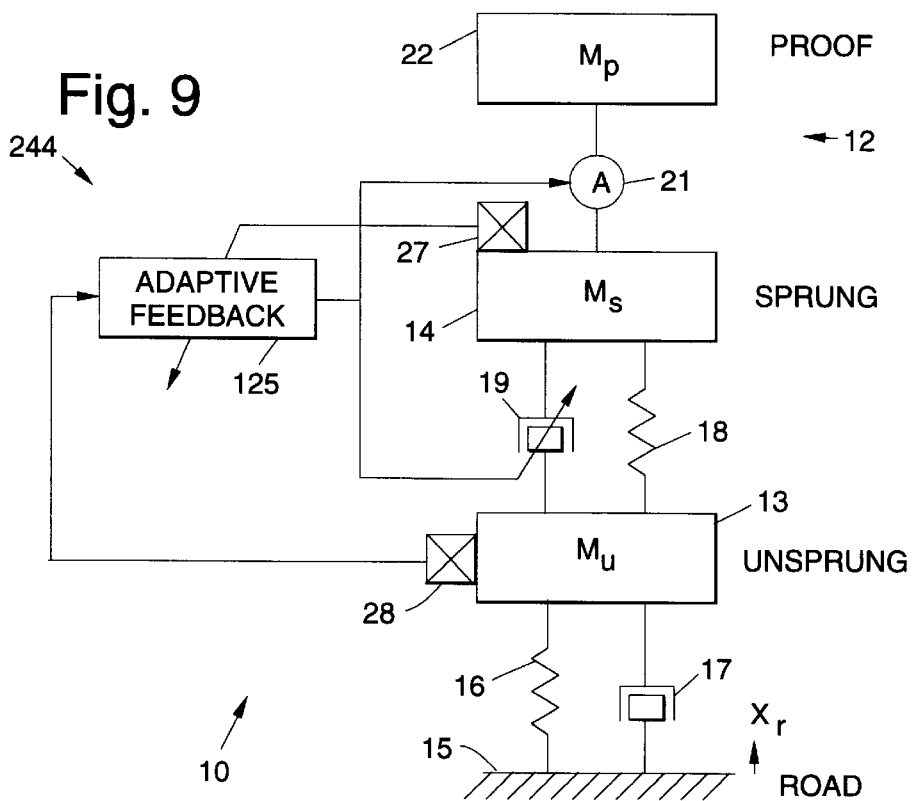
FIGS. 9 and 10 illustrate adaptive control systems using proof mass low force actuators in accordance with the present invention.
Figure 10:
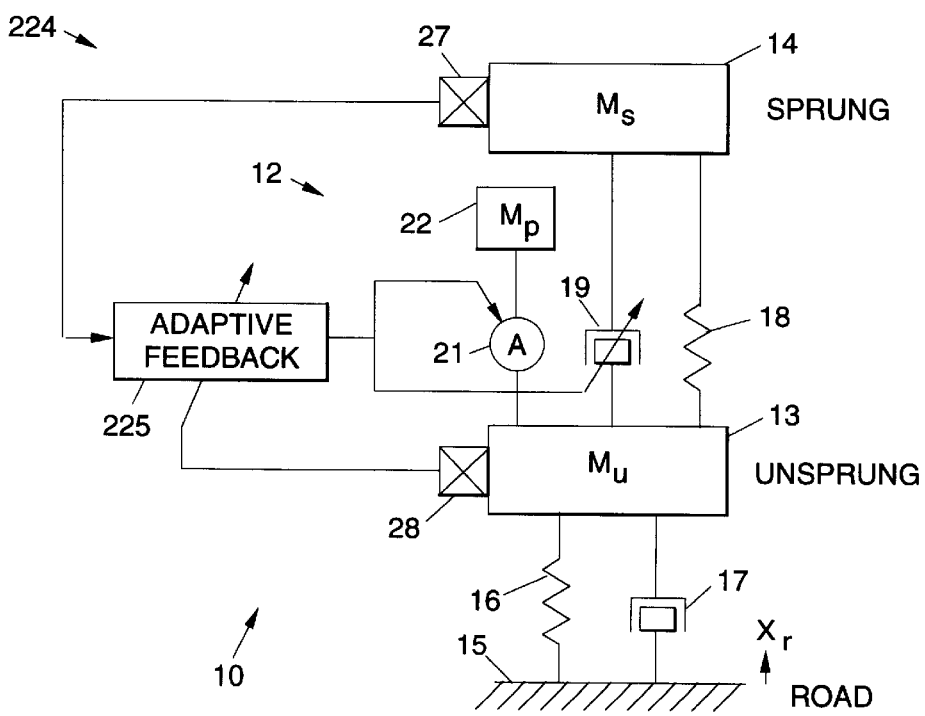
Figure 11:
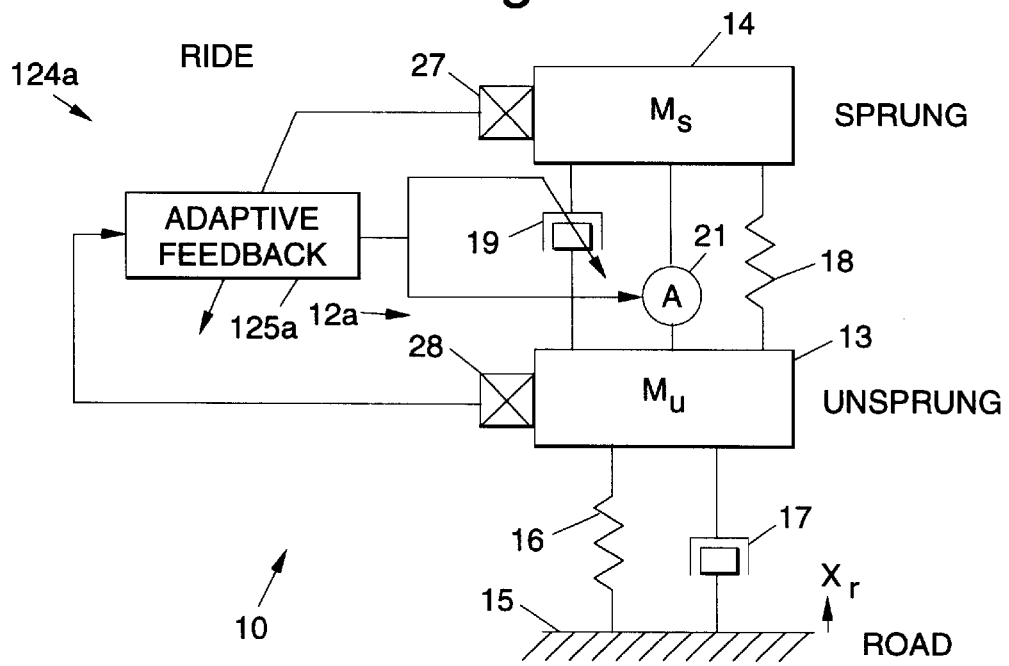
FIGS. 11 and 12 illustrate adaptive control system using differential low force actuators in accordance with the present invention.
Figure 12:
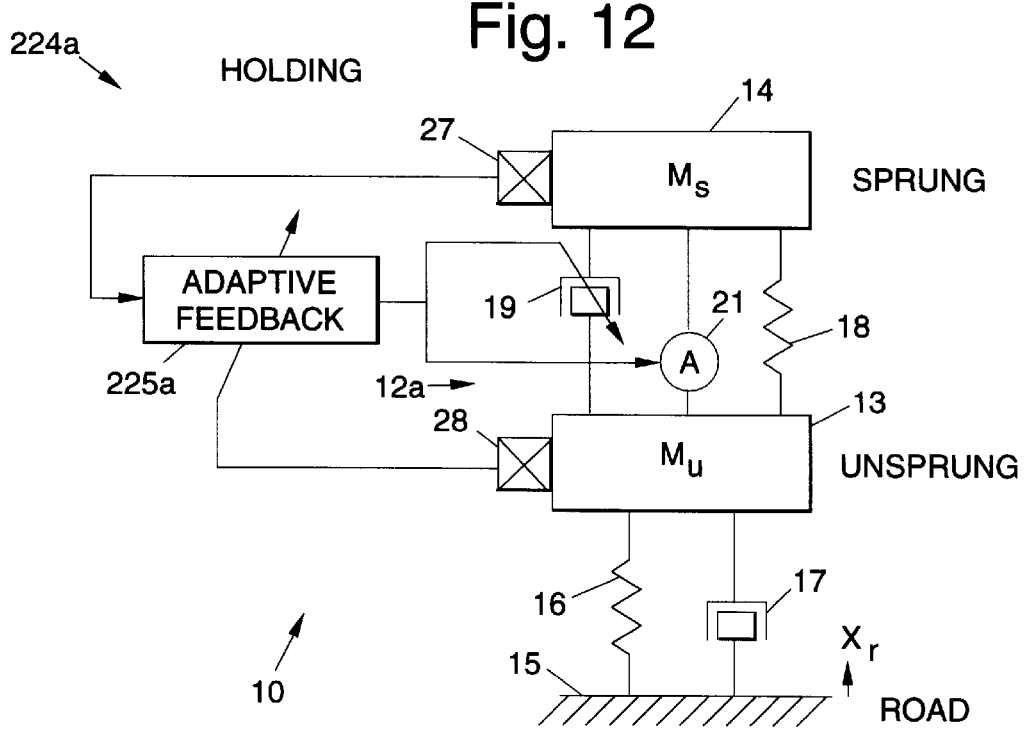

Another approach uses adaptive control to close loops on the suspension system 10, 10a using proof mass or differential force low force actuators 12, 12a as is shown in FIGS. 9–12. Note, that in these figures, as opposed to the systems 24, 24a shown in FIGS. 7 and 8, a hybrid suspension system design is shown, but the adaptive control concepts are equally applicable to passive suspension system designs. More particularly, FIGS. 9 and 10 illustrate adaptive control systems for use with the proof mass low force actuator 12 in accordance with the present invention, and FIGS. 11 and 12 illustrate adaptive control systems use with the differential force low force actuator 12a in accordance with the present invention.

FIG. 9 shows a control system 124 substantially the same as the system 24 of FIG. 7, but wherein the controller 125 is an adaptive feedback controller. The adaptive feedback controller 125 senses the forces on the sprung and unsprung masses 14, 13 by means of two accelerometers 27, 28, and adaptively controls both the linear actuator 21 and the shock absorber 19. The adaptive control is based on sensing of the unsprung mass 13. FIG. 10 shows a control system 224 that corresponds to the system 24 of FIG. 7, to except that the proof mass low force actuator 12 is disposed on the unsprung mass 13. The adaptive feedback controller 225 senses the forces on the sprung and unsprung masses 14, 13 by means of two accelerometers 27, 28, and adaptively controls both the actuator 21 and the shock absorber 19. The adaptive control is based on sensing of the sprung mass 14.

FIGS. 11 and 12 show control systems 124a, 224a similar to the system 24a of FIG. 8, but wherein the controllers 124a, 224a are adaptive feedback controllers. The adaptive feedback controllers 125a, 225a sense the forces on the sprung and unsprung masses 14, 13 by means of two accelerometers 27, 28, and adaptively controls both the actuator 21a and the shock absorber 19. In FIG. 11, adaptive control is based on sensing of the sprung mass 14, while in FIG. 12, adaptive control is based on sensing of the unsprung mass 13.

As can be appreciated from the foregoing discussion, and with reference to the figures, it can be seen that the controller is responsive to an output of the accelerometer for controlling the electromagnetic actuator to move the proof mass. In this manner, the proof mass is used to oppose relatively small high frequency forces exerted on the sprung mass.

Thus there have been described new and improved low force actuators and control systems for use in vehicle suspension control systems. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A low force actuator system for use with a suspension system of a vehicle that comprises sprung and unsprung masses, and wherein the suspension systems is coupled between the sprung and unsprung masses, said system comprising:

an electromagnetic actuator coupled to only a selected one of the sprung and unsprung masses having a size that is adapted to counter relatively small high frequency forces exerted on the vehicle;

a proof mass coupled to the electromagnetic actuator;

an accelerometer coupled to the sprung mass for sensing accelerations of the sprung mass; and a controller coupled between the accelerometer and the actuator for controlling the motion of the proof mass to oppose forces exerted on the sprung mass by components of the suspension system.

* * * * *